UNITED STATES PATENT OFFICE.

EDWARD CLARK, OF NEW YORK, N. Y.

IMPROVEMENT IN WATER-PROOF LIQUID BLACKING.

Specification forming part of Letters Patent No. 158,907, dated January 19, 1875; application filed December 12, 1874.

*To all whom it may concern:*

Be it known that I, EDWARD CLARK, of the city, county, and State of New York, have invented a new and useful Improvement in Water-Proof Liquid Blacking, of which the following is a specification:

My invention has for its object to furnish an improved liquid blacking for boots, shoes, harness, and other articles, which shall be so made that it will not injure the leather or other substance to which it may be applied, will give to said substances a patent-leather polish which will be durable, retaining the polish for a long time, and when dimmed may have the polish restored by rubbing the surface with a little sweet-oil, and will make the article to which it may be applied water-proof.

The invention consists in the blacking made of the ingredients in the proportions and manner hereinafter fully set forth.

In making my improved blacking, I take one and a quarter pound of gum-shellac, powder it, put it in a suitable vessel, pour over it one-half gallon of methylic alcohol, cover it air-tight, and allow it to stand about twenty-four hours, stirring it occasionally. I then add four ounces of gum-camphor, stir it thoroughly, and allow it to stand one hour. I then add two ounces of lamp-black, stir it, and allow it to stand about an hour. I then add one ounce of sweet-oil, one-half ounce of mutton-tallow, a quarter of a gill of Venice turpentine, about half a gallon of methylic alcohol, one and a half ounce of white turpentine, and one-eighth of an ounce of oil of mirbane, stir it thoroughly, and allow it to stand about two days, stirring it occasionally. It is then ready for use, or to be bottled for market.

The blacking thus made is to be applied with a soft camel-hair brush, and requires no rubbing beyond what is necessary to spread it evenly over the surface to be blacked.

Having thus described my invention, I claim as new and desire to secure by Letters Patent—

A water-proof blacking made of gum-shellac, methylic alcohol, gum-camphor, lamp-black, sweet-oil, mutton-tallow, turpentine, and oil of mirbane, in about the manner and proportions specified.

EDWARD CLARK.

Witnesses:
JAMES T. GRAHAM,
T. B. MOSHER.